Nov. 28, 1967  G. D. WOLFF  3,354,762
HOSE COVER STRIPPING TOOL
Filed Nov. 25, 1966  2 Sheets-Sheet 1
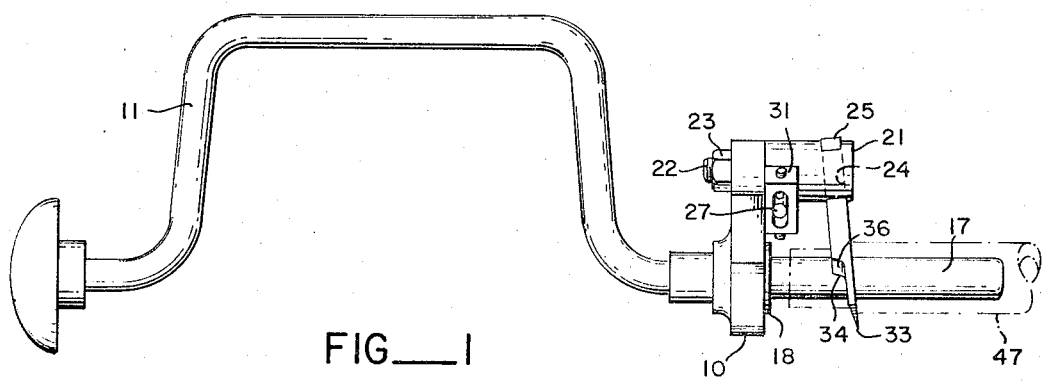
FIG—1
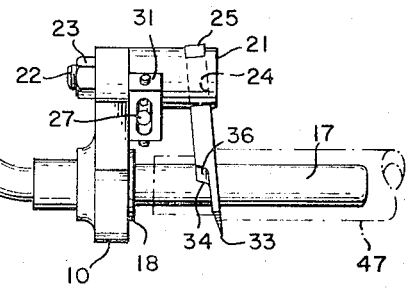
FIG—3
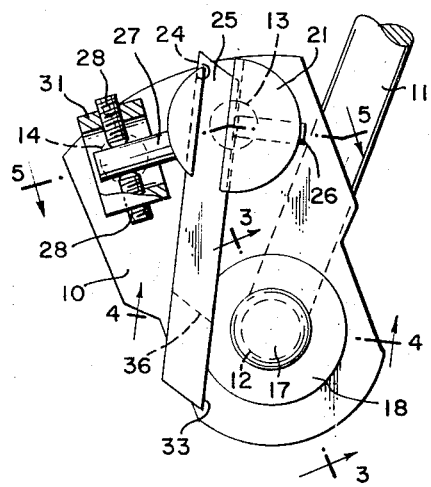
FIG—2
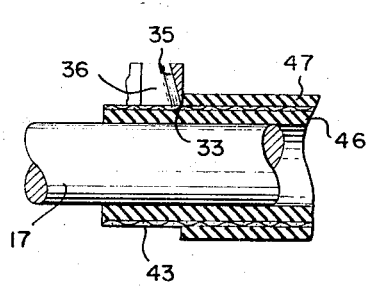
FIG—4
GEORGE D. WOLFF
INVENTOR
BY *[signature]*
ATTORNEYS Nov. 28, 1967   G. D. WOLFF   3,354,762
HOSE COVER STRIPPING TOOL
Filed Nov. 25, 1966   2 Sheets-Sheet 2
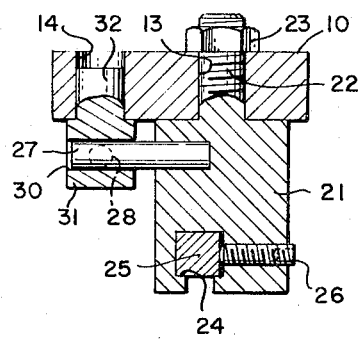
FIG___5
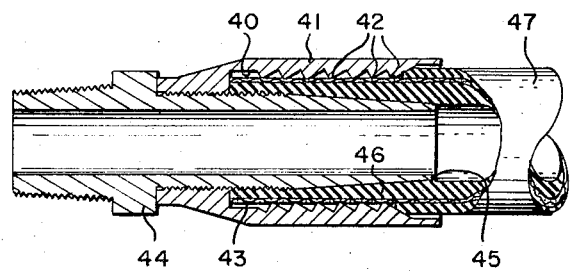
FIG___7
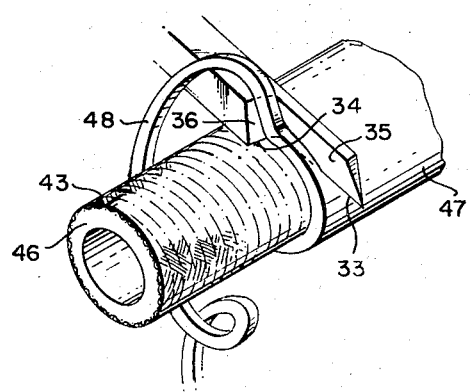
FIG___6
GEORGE D. WOLFF
*INVENTOR.*
BY
*ATTORNEYS*

United States Patent Office 3,354,762
Patented Nov. 28, 1967

3,354,762
HOSE COVER STRIPPING TOOL
George D. Wolff, 8410 Dallas S.,
Seattle, Wash. 98108
Filed Nov. 25, 1966, Ser. No. 597,048
9 Claims. (Cl. 82—4)

ABSTRACT OF THE DISCLOSURE

This invention relates to a hose cover stripping tool, and namely a tool for stripping the rubber outer cover from high-pressure hose of the type having a reinforcing layer or layers of braided or spiral wire between said outer cover and a rubber inner tube. The purpose in stripping the outer cover is to prepare the hose for its insertion into the sprocket piece of a selected one of a variety of terminal fittings.

---

The invention aims to provide a tool of relatively simple and inexpensive construction which will efficiently perform its intended function with ease and expedition.

This and other more particular objects and advantages in view will appear and be understood in the course of the following description and claims.

Description of drawings

In the accompanying drawings:

FIGURE 1 is an elevational view showing a tool constructed to embody preferred teachings of the present invention, and incorporating a broken-line illustration of the end of a hose in process of having the cover stripped therefrom.

FIG. 2 is a fragmentary end elevation thereof drawn to an enlarged scale and deleting any portrayal of the hose.

FIGS. 3, 4, and 5 are fragmentary transverse vertical sectional views on the lines 3—3, 4—4, and 5—5, respectively, and including in FIG. 4 a full-line illustration of a hose being stripped.

FIG. 6 is a perspective view to illustrate, schematically, the manner in which the blade of the present invention performs its stripping function; and FIG. 7 is a fragmentary longitudinal vertical sectional view showing a hose end which has been stripped of its cover and a fitting applied thereto.

Description of invention

Referring to said drawings, the numeral 10 denotes a frame-piece for the tool. Adapted to be rotated by means such as a brace 11, the frame is or may be formed from bar stock, aluminum alloy by preference, and is drilled on paralleling axes to provide three mounting holes 12, 13 and 14. Shown as being bossed at the back face, the hole 12 is tapped and has introduced from the back and the front ends a respective one of two threaded studs 15 and 16. The stud 15 extends as a reduced stem axially from the inner end of the brace and serves as a removable atachment so that several different sizes of frame, each related to one of several diameters of hose, can be used with a single brace. The stud 16 extends as a reduced stem from a mandrel 17.

The hose end which is to be stripped is slipped over the mandrel and at the conclusion of a stripping operation is brought to bear against a hardened steel washer 18 fitting the stud 16 and clamped between the shoulder 19 of the mandrel and the front face of the frame-piece. In the use of the stripping tool the hose remains stationary while the frame-piece turns, and the function of the washer is to protect the front face of the frame-piece against becoming scored from projecting ends of the hose's wire reinforcing.

The two holes 13 and 14 are each a smooth bore and are spaced one from another and from the hole 12. While in no sense critical I find that a desirable spacing between the holes 12 and 13 is approximately three times the diameter of the mandrel. A lesser spacing is provided between the holes 13 and 14.

Receiving a mounting from the hole 13 is a holder for a cutting blade. The holder presents a cylindrical head 21 and has a threaded stem 22 extending as a reduced axial prolongation therefrom. The stem fits the hole and is secured in place by a nut 23. A groove 24, rectangular in cross-section with its top and bottom flats paralleling a diameter of the head 21, is cut transversely through the head on an off-center axis biased approximately 5° from the axial line of the head. A shank portion 25 of the cutting blade is received for endwise adjustment in the groove and is secured in its adjusted position by a set screw 26.

For rotary adjustment of the holder, and as a locking complement to the nut 23, the holder has a lever arm 27 which extends radially from the head. The lever arm is adjustably set by two micrometer screws 28 within minor limits of swing adjustment prescribed by a slot 30 formed in the head of a swivel-mounted anchor-piece 31. The hole 14 receives a stem 32 of said anchor-piece to provide the swivel mounting.

Reverting to the cutting blade, which is formed from tool steel stock, rectangular in cross-section, fitting the rectangular groove 24 of the holder, an end of such blade overhangs the mandrel and has upon its underside a narrow-angled longitudinal cutting edge 33 and a wide-angled transverse cutting edge 34. Hereinafter termed a slitting edge and a peeling edge, respectively, these two edges are ground sharp and occur one along the lower margin of the side wall 35 and the other along the lower margin of the end wall 36 of a rather long rearwardly facing reentrant recess milled in the blade. The milling is so performed that the side wall 35 intersects the front face of the blade in the plane of the blade's bottom face, while the end wall 36 has both a moderate bias (on the order of 15° from the back face by preference) and a steep slope (on the order of 60° from the top face by preference). The slitting edge 33 is spaced from the frame-piece a distance approximating the length of the socket 40 of the female component 41 of a fitting (FIG. 7) into which the stripped end of a length of hose is to be inserted. Annular or spiral ribs 42 provided in the internal wall of the socket press into the bared reinforcing wire 43 of the stripped hose as the nut component 44 of the fitting is threaded into the component 41 and causes its nipple 45 to expand the inner tube 46 of the hose.

In preparing the tool for use the nut 23 is loosened and the lever arm 27 is adjusted by the micrometer screws so as to locate the slitting edge 33 tangent to a circle having as its radius the outer surface of the wire 43 which reinforces the hose which is to be stripped. Nut 23 is then tightened, following which the cutting blade is adjustably located by backing off the set screw 26, positioning the blade so that the stripping edge 34 coincides, or approximately coincides, with a plane projected radially from the mandrel perpendicular to said tangent, and fixing the blade in such adjusted position.

The end of a hose which is to be stripped is slipped onto the mandrel until contact is made with the blade. As the brace is now rotated through a number of turns, the slitting edge 33 walks spirally about the hose, cutting the outer cover 47 into a continuous ribbon 48 which is progressively peeled off the reinforcing wire by the edge 34.

Should it be desired, and in lieu of the brace, a suitable adapter can be provided to fit the rear socket of the hole 12 and enable the tool to be attached to a chuck or other drive fitting on the arbor of a power machine.

It is believed that the invention will have been clearly understood from the foregoing detailed description of my now preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What is claimed is:

1. In a tool for stripping the outer cover from an end portion of hose which is reinforced by a layer of wire, a mandrel fitting within said end, a frame supporting the mandrel and admitting to turning motion about the center of the mandrel as an axis, a blade holder carried by the frame to occupy a position spaced to one side of the mandrel and receiving from the frame a journal permitting rotary adjustment about an axis paralleling the axis of the mandrel, a blade having a linear slitting edge and carried by the blade holder in a position locating the edge in overlying relation to the mandrel in a plane biased somewhat more than 90° from the axis of the mandrel, the slitting edge, by said turning adjustment of the holder, being adapted to be placed on a line projected tangent to a circle approximately coinciding with the outer surface of the hose's wire reinforcing, means for setting the holder in said adjusted position, and means for turning the frame relative to the hose in a direction causing the slitting edge of the blade to trace a spiral path in an end portion of the hose cutting therefrom a continuous ribbon of the outer cover.

2. A cover-stripping tool as claimed in claim 1, said slitting edge being defined by the intersection of a front face which lies perpendicular to the surface of the hose and a back face steeply inclined to said hose surface.

3. A cover-stripping tool as claimed in claim 2, the blade also having a cutting edge which acts to peel said spiral ribbon from the layer of wire, said peeling edge extending laterally as a backwardly angled continuation of the slitting edge at the trailing end of the latter and being defined by the intersection of two faces one of which coincides with said tangent and the other of which is inclined more than 90° therefrom.

4. A cover-stripping tool as claimed in claim 1 in which the blade is formed from a length of tool steel stock rectangular in section.

5. A cover-stripping tool as claimed in claim 4, the blade holder having a cross-groove cut therein to receive the blade for adjustment endwise to its length, and having means for setting the blade in said adjusted position.

6. A cover-stripping tool as claimed in claim 1, said turning adjustment of the blade holder being afforded by a pair of micrometer screws bearing from opposite sides upon a lever arm extending radially from the holder.

7. A cover-stripping tool as claimed in claim 1 in which the frame has a hole drilled through the same and tapped from both ends, the mandrel being formed with a reduced stem which threads into one end of said drill hole, the means for turning the frame being threaded into the other end of the drill hole.

8. A cover-stripping stool as claimed in claim 7, the means for turning the frame comprising a brace.

9. A cover-stripping tool as claimed in claim 7 having a hardened steel washer fitting over said stem of the mandrel and caught between the frame and the shoulder which lies between the stem and the mandrel and serving to protect the face of the frame against being scored by protruding strands of the reinforcing wire as the frame is turned relative to the hose being stripped.

References Cited
UNITED STATES PATENTS

| | | | |
|---|---|---|---|
| 2,145,091 | 1/1939 | Mansfield | 82—4 X |
| 2,348,186 | 5/1944 | Bashore | 82—4 X |
| 2,753,739 | 7/1956 | Dreier | 82—4 X |
| 3,204,495 | 9/1965 | Matthews | 81—9.5 |

WILLIAM FELDMAN, *Primary Examiner.*

MILTON S. MEHR, *Examiner.*